US012591236B2

(12) United States Patent　　　　(10) Patent No.:　US 12,591,236 B2
Hayashi et al.　　　　　　　　　　(45) Date of Patent:　　Mar. 31, 2026

(54) REMOTE SUPPORT SYSTEM AND REMOTE SUPPORT METHOD

(71) Applicant: TOYOTA JIDOSHA KABUSHIKI KAISHA, Toyota (JP)

(72) Inventors: Yusuke Hayashi, Susono (JP); Taichi Kawanai, Susono (JP); Daichi Hotta, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 17/959,778

(22) Filed: Oct. 4, 2022

(65) Prior Publication Data

US 2023/0114008 A1　　Apr. 13, 2023

(30) Foreign Application Priority Data

Oct. 7, 2021　(JP) ................................. 2021-165709

(51) Int. Cl.
　　G05D 1/00　　　　　(2024.01)
(52) U.S. Cl.
　　CPC ......... G05D 1/0077 (2013.01); G05D 1/0038 (2013.01); G05D 1/0212 (2013.01)
(58) Field of Classification Search
　　CPC ... G05D 1/0077; G05D 1/0038; G05D 1/0212
　　See application file for complete search history.

(56) References Cited

U.S. PATENT DOCUMENTS 11,215,982 B2　1/2022　Urano et al.
11,325,618 B2　5/2022　Umeda 2011/0106361 A1* 　5/2011　Staempfle .......... B62D 15/0265
　　　　　　　　　　　　　　　　　　　　　　701/23
2015/0248131 A1* 　9/2015　Fairfield .............. G05D 1/0038
　　　　　　　　　　　　　　　　　　　　　　701/2
2018/0015922 A1* 　1/2018　McNew ................ B60W 10/20
2018/0196437 A1* 　7/2018　Herbach ................ G01C 21/34
2018/0267537 A1* 　9/2018　Kroop ................... B60W 30/10
2019/0118801 A1 　4/2019　Noh et al.
2019/0137999 A1 　5/2019　Taguchi et al.
　　　　　　　　　　(Continued)

FOREIGN PATENT DOCUMENTS

JP　　　2017-147626 A　　8/2017

*Primary Examiner* — Anne Marie Antonucci
*Assistant Examiner* — Patrick M Brady
(74) *Attorney, Agent, or Firm* — Dinsmore & Shohl LLP

(57)　　　　　ABSTRACT

A remote support system requests a remote operator to perform remote support for passing through a predetermined area, when a vehicle is determined to be in a remote support request situation that a continuation of autonomous driving is difficult due to the vehicle during autonomous driving and one or more avoidance target vehicles approaching each other in the predetermined area. Then, the system displays information of the one or more avoidance target vehicles on a display of the remote operator, receives information of a starting reference vehicle serving as a reference for start permission designated by the remote operator from the displayed information, determines whether the starting reference vehicle has passed through the predetermined area, and causes the vehicle to pass through the predetermined area by autonomous driving in case where the starting reference vehicle has passed through the predetermined area.

7 Claims, 14 Drawing Sheets

(56) References Cited

U.S. PATENT DOCUMENTS

| 2020/0209888 | A1 | 7/2020 | Sakai et al. |
| 2020/0258380 | A1* | 8/2020 | Wissing .................. G08G 1/04 |
| 2020/0326702 | A1* | 10/2020 | Iwamoto .................. B60T 7/16 |
| 2021/0041894 | A1 | 2/2021 | Urano et al. |
| 2021/0055741 | A1 | 2/2021 | Kawanai et al. |
| 2021/0058173 | A1 | 2/2021 | Otaki et al. |
| 2021/0072743 | A1 | 3/2021 | Otaki et al. |
| 2021/0080943 | A1 | 3/2021 | Iwamoto et al. |
| 2021/0149389 | A1* | 5/2021 | Weslosky ............. G05D 1/0038 |

* cited by examiner

STARTING REFERENCE VEHICLE

V3

TR4

SP

TR3

L3

L4

10

TR4

SP

TR3

L5

L6

10

V4

REMOTE SUPPORT SYSTEM AND REMOTE SUPPORT METHOD

CROSS-REFERENCE TO RELATED APPLICATION

The present application claims priority under 35 U.S.C. § 119 to Japanese Patent Application No. 2021-165709, filed Oct. 7, 2021, the contents of which application are incorporated herein by reference in their entirety.

BACKGROUND

Field

The present disclosure relates to a remote support system and a remote support method for transmitting a remote support request for a vehicle to a remote operator.

Background

JP 2017-147626 A discloses a technique related to a remote-control system for reducing a burden on an operator. The remote-control system of this technology is equipped with a vehicle which makes a remote-control request to the control center, and a control center in which a remote-control device which remotely controls the vehicle which made a remote-control request is installed. The vehicle makes a remote-control request to the control center when it enters the remote-control target area. Then, when the vehicle to be remotely operated leaves the remote operation target area in which the vehicle is currently travelling, a remote operation end notification is transmitted to the vehicle.

SUMMARY

According to the technology of JP 2017-147626 A, the remote control is continued until the vehicle to be remotely operated leaves the remote-control target area in which the vehicle is currently traveling. In this case, the restraint time of the remote operator may be prolonged.

The present disclosure has been made in view of the problems as described above, and an object thereof is to provide a remote support system and a remote support method capable of shortening the restraint time of a remote operator performing remote support of the autonomous driving vehicle as much as possible.

In order to solve the above problems, the present disclosure is applied to a remote support system configured to request a remote operator to perform remote support for passing through a predetermined area, when a vehicle is determined to be in a remote support request situation that a continuation of autonomous driving is difficult due to the vehicle during autonomous driving and one or more avoidance target vehicles approaching each other in the predetermined area. The system includes at least one memory in which at least one program is stored, and at least one processor coupled to the at least one memory. When the vehicle is determined to be the remote support request situation, the at least one program is configured to cause the at least one processor to execute display process for displaying information of the one or more avoidance target vehicles on a display of the remote operator, reception process of receiving information of a starting reference vehicle serving as a reference for start permission designated by the remote operator from the information of the one or more avoidance target vehicles displayed, determination process of determining whether the starting reference vehicle has passed through the predetermined area, and vehicle control process of causing the vehicle to pass through the predetermined area by autonomous driving in case where the system determines that the starting reference vehicle has passed through the predetermined area.

In the present disclosure, the vehicle control process may be configured to cause the vehicle to wait at a predetermined waiting position by autonomous driving until the system determines that the starting reference vehicle has passed through the predetermined area.

In the present disclosure, the display process may be configured to display each of the one or more avoidance target vehicles in an overhead view together with identification information. The receiving process may be configured to receive selection of the identification information by the remote operator.

In the present disclosure, the display may a touch panel display. The display process may be configured to display an overhead view including each of the one or more avoidance target vehicles on the touch panel display. The reception process may be configured to receive designation of the starting reference vehicle from the touch panel display.

In the present disclosure, the display process may be configured to display a confirmation message specifying any one of the one or more avoidance target vehicles as the starting reference vehicle. The reception process is configured to receive whether the confirmation message is correct.

In the present disclosure, when the vehicle is determined to be the remote support request situation, the at least one program may be configured to cause the at least one processor to execute calculating a predicted passing order in which the one or more avoidance target vehicles pass through the predetermined area, and canceling reception of the starting reference vehicle in a case where a change occurs in the predicted passing order after the designation of the starting reference vehicle is received by the reception process.

Further, the present disclosure is applied to a remote support method for requesting a remote operator to perform remote support for passing through the predetermined area, when a vehicle is determined to be in a remote support request situation that a continuation of autonomous driving is difficult due to the vehicle during autonomous driving and one or more avoidance target vehicles approaching each other in the predetermined area. When the vehicle is determined to be the remote support request situation, the method includes displaying information of the one or more avoidance target vehicles on a display of the remote operator, receiving information of a starting reference vehicle serving as a reference for start permission designated by the remote operator from the information of the one or more avoidance target vehicles displayed, determining whether the starting reference vehicle has passed through the predetermined area, and causing the vehicle to pass through the predetermined area by autonomous driving in case where the system determines that the starting reference vehicle has passed through the predetermined area.

According to the present disclosure, when the vehicle is determined to be the remote support request situation, the remote operator designates a starting reference vehicle serving as a reference for start permission from the information of the one or more avoidance target vehicles displayed on the display. According to such a configuration, since it is not necessary to restrain the remote operator until the vehicle passes through the predetermined area, it is possible to shorten the restraint time of the remote operator.

DETAILED DESCRIPTION

Hereinafter, an embodiment of the present disclosure will be described with reference to the accompanying drawings. However, it is to be understood that even when the number, quantity, amount, range, or other numerical attribute of each element is mentioned in the following description of the embodiment, the present disclosure is not limited to the mentioned numerical attribute unless explicitly described otherwise, or unless the present disclosure is explicitly specified by the numerical attribute theoretically.

First Embodiment

Figure 1:
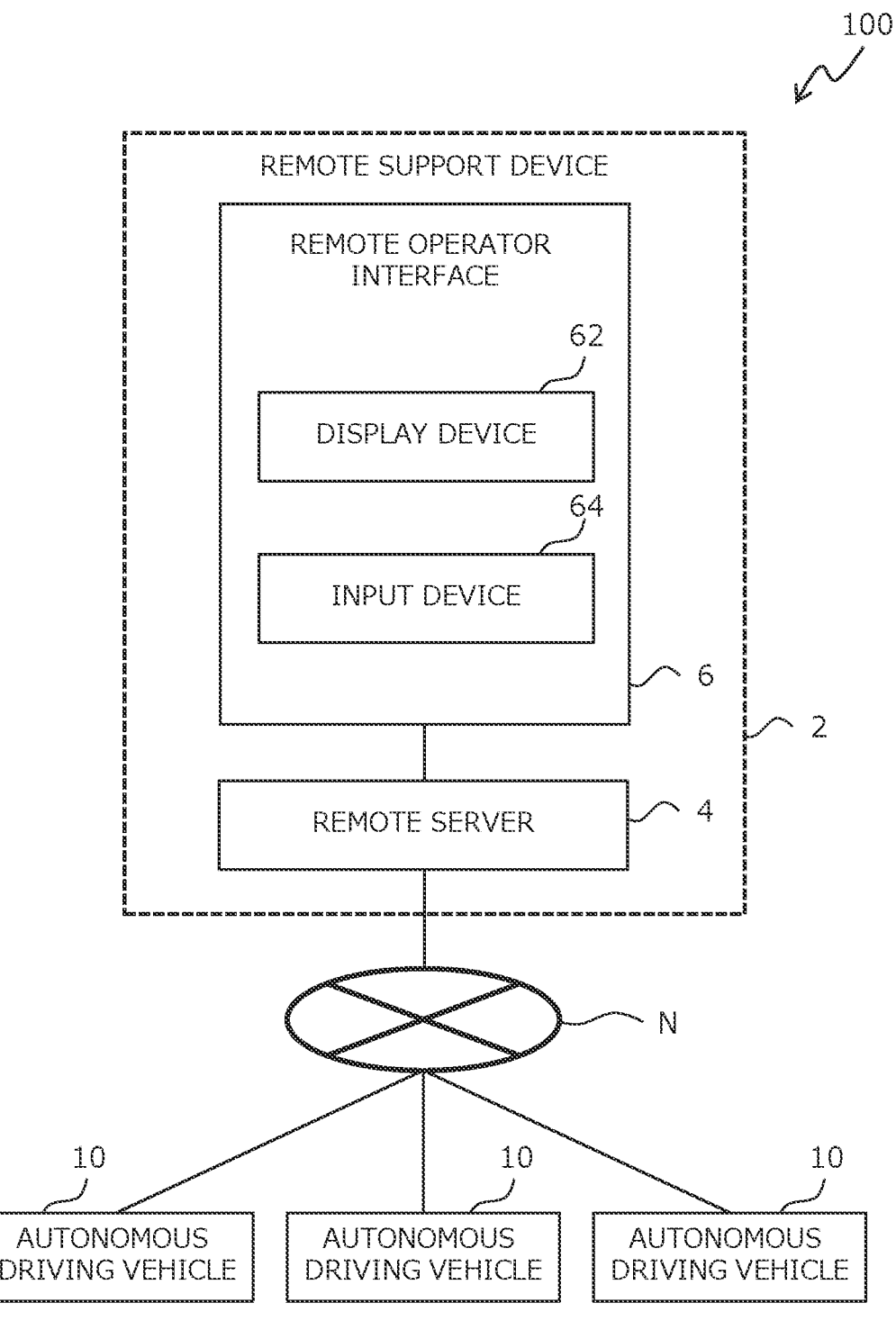
FIG. 1 is a block diagram illustrating a configuration example for explaining an outline of a remote support system according to a first embodiment.

1-1. Overall Configuration of Remote Support System According to First Embodiment First, a schematic configuration of a remote support system according to the first embodiment will be described. FIG. 1 is a block diagram illustrating a configuration example for explaining an outline of a remote support system according to a first embodiment. A remote support system 100 shown in FIG. 1 is a system for performing remote support for supporting travel of an autonomous driving vehicle 10 to the autonomous driving vehicle 10. Hereinafter, the autonomous driving vehicle 10 used in the remote support system 100, simply referred to as a "vehicle 10".

The remote support supports a part of recognition or determination of the surrounding environment of the vehicle 10. The remote support is provided by a remote operator standing by at a remote location. There is no limit to the number of remote operators utilized by the remote support system 100. Further, there is no limitation on the number of vehicles 10 used in the remote support system 100.

As shown in FIG. 1, the remote support system 100 includes a vehicle 10 and a remote support device 2. The remote support device 2 includes a remote server 4 and a remote operator interface 6 for remote operators to perform remote support input and output. The remote server 4 is communicably connected to the vehicle 10 via a communication network N. Various types of information are transmitted from the vehicle 10 to the remote server 4. The remote operator interface 6 includes a display device 62 for displaying information transmitted from the vehicle 10 in driving support, and an input device 64 for inputting information. The display device 62 and the input device 64 may be, for example, a touch panel display having a display function and an input function. Since a known technique can be adopted for the configuration of the remote support device 2, detailed description thereof will be omitted here.

In the remote support system 100, the vehicle 10 makes a remote support request to the remote support device 2 when passing through a predetermined area where it is determined that remote support is necessary. Here, the remote support is a determination as to whether or not the predetermined area can pass through. The passage through the predetermined area is, for example, a right turn through at an intersection. In the remote support system 100, in response to a remote support request transmitted from the vehicle 10, a remote operator performs remote support via the remote support device 2. Typically, the remote operator inputs passage determination information to the remote operator interface 6. The remote server 4 transmits the passage determination information to the vehicle 10 via the communication network N. The vehicle 10 performs autonomous driving according to the passage determination information transmitted from the remote support device 2 and passes through the predetermined area. The remote support system 100 according to the present embodiment is characterized by the contents of the passage determination information input by the remote operator. The passage determination information will be described in detail later.

Figure 2:
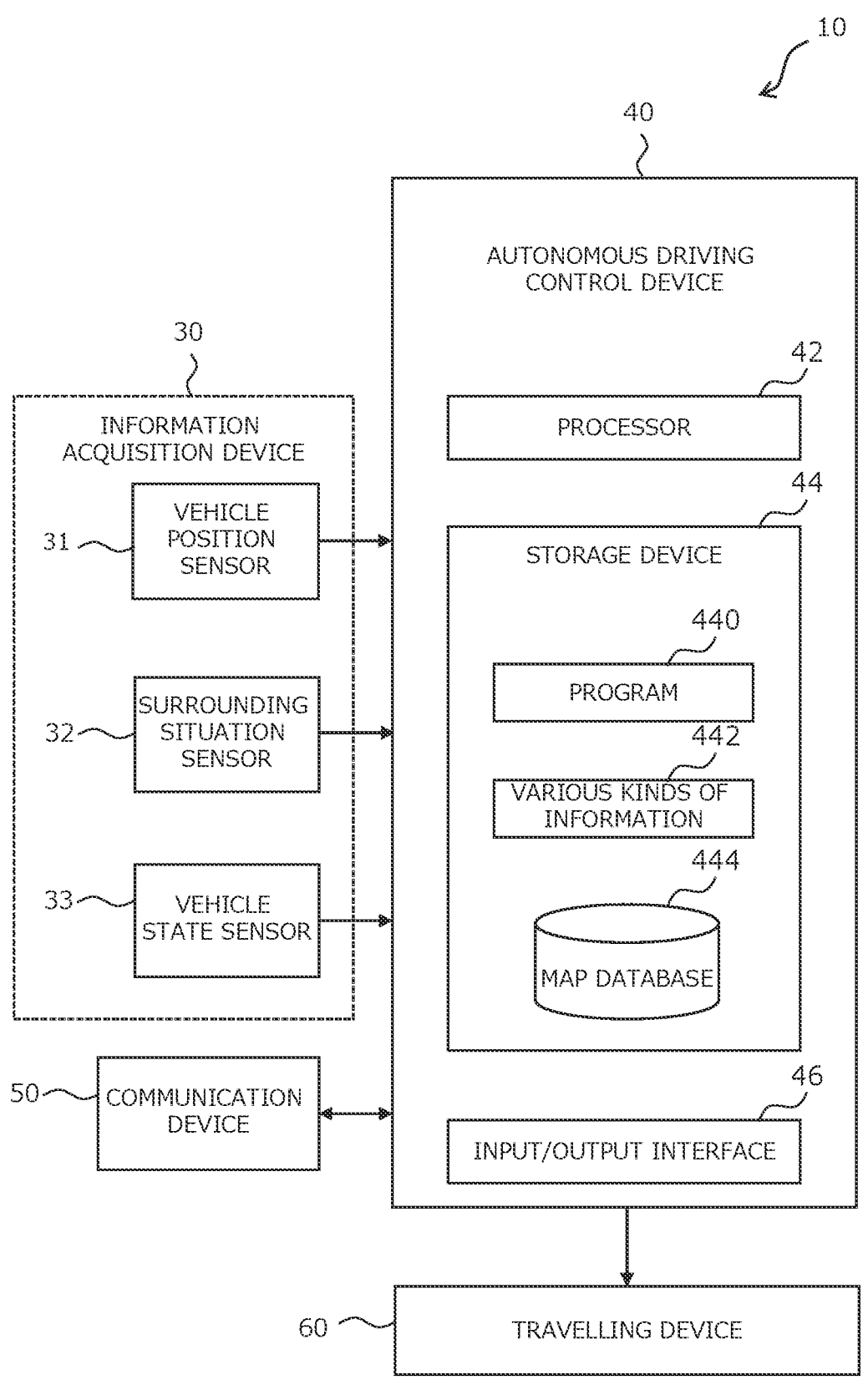
FIG. 2 is a block diagram illustrating an example of a configuration of an autonomous driving vehicle.

1-2. Configuration of Autonomous Driving Vehicle According to First Embodiment Next, an example of a configuration relating to the autonomous driving of the autonomous driving vehicle 10 applied to the remote support system 100 of the first embodiment will be described. FIG. 2 is a block diagram illustrating an example of a configuration of the autonomous vehicle 10. The vehicle 10 is an autonomous driving vehicle capable of autonomous driving. Here, the autonomous driving is assumed to be autonomous driving of level 3 or higher in the level definition of SAE (Society of Automotive Engineers). Note that the power source of the vehicle 10 is not limited.

The vehicle 10 includes an autonomous driving control device 40. The autonomous driving control device 40 has a function for performing autonomous driving of the vehicle 10 in accordance with remote support information transmitted from a remote operator. An information acquisition device 30, a communication device 50, and a traveling device 60 are connected to the autonomous driving control device 40.

The information acquisition device 30 includes a vehicle position sensor 31, a surrounding situation sensor 32, and a vehicle state sensor 33.

The vehicle position sensor 31 detects a position and a direction of the vehicle 10. For example, the vehicle position sensor 31 includes a GPS (Global Positioning System) sensor. The GPS sensor receives signals transmitted from a plurality of GPS satellites and calculates the position and orientation of the vehicle 10 based on the received signal. The vehicle position sensor 31 may perform a well-known localization process to improve the accuracy of the current position of the vehicle 10. Information detected by the vehicle position sensor 31 is transmitted to the autonomous driving control device 40 as necessary as a part of the surrounding environment information.

The surrounding situation sensor 32 recognizes surrounding information of the vehicle 10. For example, the surrounding situation sensor 32 may be a camera (imaging device), a LIDAR: Laser Imaging Detection and a radar, or the like. The surrounding information includes target information recognized by the surrounding situation sensor 32. Examples of the target include a surrounding vehicle, a pedestrian, a roadside object, an obstacle, a white line, and a traffic light. The target information includes a relative position and a relative speed of the target with respect to the vehicle 10. The information recognized by the surrounding situation sensor 32 is transmitted to the autonomous driving control device 40 as part of the surrounding environment information at any time.

The vehicle state sensor 33 detects vehicle information indicating a state of the vehicle 10. As the vehicle state sensor 33, a vehicle speed sensor, a lateral acceleration sensor, a yaw rate sensor or the like is exemplified. Information detected by the vehicle state sensor 33 is transmitted to the autonomous driving control device 40 as part of the vehicle motion information at any time.

The communication device 50 communicates with the vehicle and the outside. For example, the communication device 50 transmits and receives various kinds of information to and from the remote support device 2 via the communication network N. The communication device 50 communicates with external devices such as roadside devices, surrounding vehicles, and surrounding infrastructure. The roadside device is, for example, a beacon device that transmits traffic congestion information, traffic information for each lane, restriction information such as a pause, information on a traffic situation at a blind spot, and the like. When the external devices are peripheral vehicles, the communication device 50 performs vehicle-to-vehicle communication (V2V communication) with the peripheral vehicles. Further, when the external device is a peripheral infrastructure, the communication device 50 performs road-to-vehicle communication (V2I communication) with the peripheral infrastructure.

The traveling device 60 includes a steering device, a driving device, and a braking device. The steering device steers wheels of the vehicle 10. The driving device is a driving source for generating a driving force of the vehicle 10. Examples of the driving device include an engine or an electric motor. The braking device generates a braking force on the vehicle 10. The traveling device 60 controls the travel of the vehicle 10 based on a travel control amount related to steering, acceleration, and deceleration of the vehicle 10.

The autonomous driving control device 40 is an information processing device that performs various processes in autonomous driving and remote autonomous driving. Typically, the autonomous driving control device 40 is a microcomputer including at least one processor 42, at least one storage device 44, and at least one input/output interface 46. The autonomous driving control device 40 is also referred to as an ECU (Electronic Control Unit).

Various kinds of information 442 are stored in the storage device 44. For example, the various kinds of information 442 includes the surrounding environment information and the vehicle motion information described above. Examples of the storage device 44 include a volatile memory, a nonvolatile memory, and HDDs (Hard Disk Drive).

A map database 444 is stored in the storage device 44. The map database 444 is a database that stores map information. The map information includes location information of roads, information of road shapes, the number of lanes, the lane widths, location information of intersections and branch points, traffic environment information indicating the traffic environment such as priority of roads, and the like. The map database 444 may be stored in a server that can communicate with the vehicle 10, such as the remote server 4 of the remote support device 2.

The processor 42 includes a central processing unit (CPU). The processor 42 is coupled to the storage device 44 and the input/output interface 46. At least one program 440 related to autonomous driving is stored in the storage device 44. Various functions of the autonomous driving control device 40 are realized by the processor 42 reading and executing the program 440 stored in the storage device 44.

The input/output interface 46 is an interface for exchanging information with the remote support device 2. Various kinds of information generated in the autonomous driving control device 40 and a remote support request described later are output to the remote support device 2 via the input/output interface 46.

1-3. Features of Remote Support System According to First Embodiment

Figure 3:
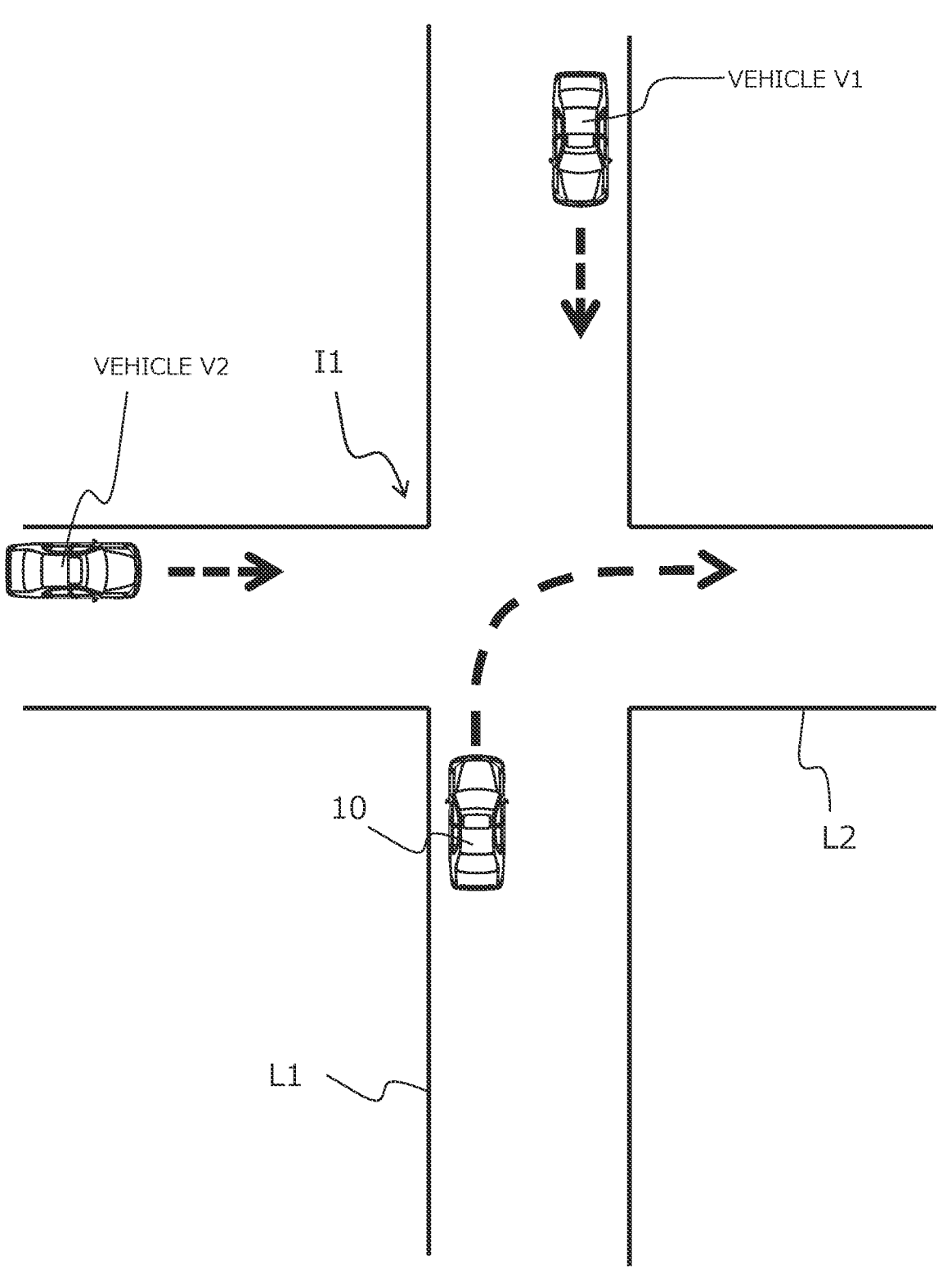
FIG. 3 is a diagram for explaining an example of a situation in which remote support is executed in the remote support system.

Next, an example of a situation in which remote support by a remote operator is executed in the remote support system 100 according to the first embodiment will be described. FIG. 3 is a diagram for explaining an example of a situation in which remote support is executed in the remote support system.

In the remote support system 100, a remote support request is made to the remote support device 2 when the vehicle is determined to be in a remote support request situation in which the remote support request is to be made to the remote support device 2. Such a remote support request situation is, for example, a situation where the vehicle 10 enters "a position where the own vehicle is not priority" or "a position where the priority of the own vehicle is equal to another vehicle". The remote support request situation may be preset including, for example, a situation element that can be determined from the map information. Typically, the remote support request situation is a situation in which the vehicle 10 passes through a predetermined area that can be determined from the map information with a specific situation element. Examples of such a remote support request situation include a situation in which the vehicle 10 turns right at a specific intersection, a situation in which the vehicle 10 goes straight or turns left after pausing at a specific intersection, a situation in which the vehicle 10 starts a lane change, a situation in which the vehicle 10 passes across lanes in order to avoid a parked vehicle, and the like.

The traffic environment shown in FIG. 3 is an intersection I1 where a lane L1 and a lane L2 intersect. The lane L2 is the priority lane with respect to the lane L1. The vehicle 10 is travelling in the lane L1 toward the intersection I1. The vehicle V1 is traveling on the lane L1 from the direction opposite to the vehicle 10 toward the intersection I1. The vehicle V2 is traveling in the lane L2 toward the intersection I1 from the left direction of the vehicle 10.

The autonomous driving control device 40 of the vehicle 10 generates a travel plan traveling from the lane L1 to the lane L2 by turning right at the intersection. In this case, when the vehicle 10 approaches the intersection I1, the autonomous driving control device 40 recognizes that the vehicle 10 is a situation of entering the non-priority lane, and determines to be the remote support request situation. The autonomous driving control device 40 transmits a remote support request REQ to the remote support device 2 and transmits display information INF1 to be described later.

Upon receiving the remote support request REQ, the remote support device 2 performs remote support by a remote operator. Typically, the remote support device 2 displays the received display information INF1 on the display device 62. This process is hereinafter referred to as "display process". The remote operator performs the passage determination of the intersection I1 while referring to the display information INF1 displayed on the display device 62. Then, the remote operator transmits a remote instruction to the vehicle 10 by operating the remote operator interface 6.

Here, for example, when the remote instruction of the remote support system includes the operation amount of the traveling device 60, the remote operator is constrained from the time when the remote support request REQ is received until the time when the vehicle V1 or V2 passes through the intersection I1 and then the vehicle 10 actually passes through the intersection I1 to the right turn.

Further, when the remote instruction of the remote support system includes a remote instruction of the operation start timing such as "start of right turn", the remote operator is constrained from the time when the remote support request REQ is received until the time when the vehicle V1 or V2 passes through the intersection I1 and then transmits the operation start instruction. As described above, in the configuration in which the remote operator directly and remotely instructs the travel start timing of the vehicle 10, there is a problem that the remote operator is constrained for a long time.

Figure 4:
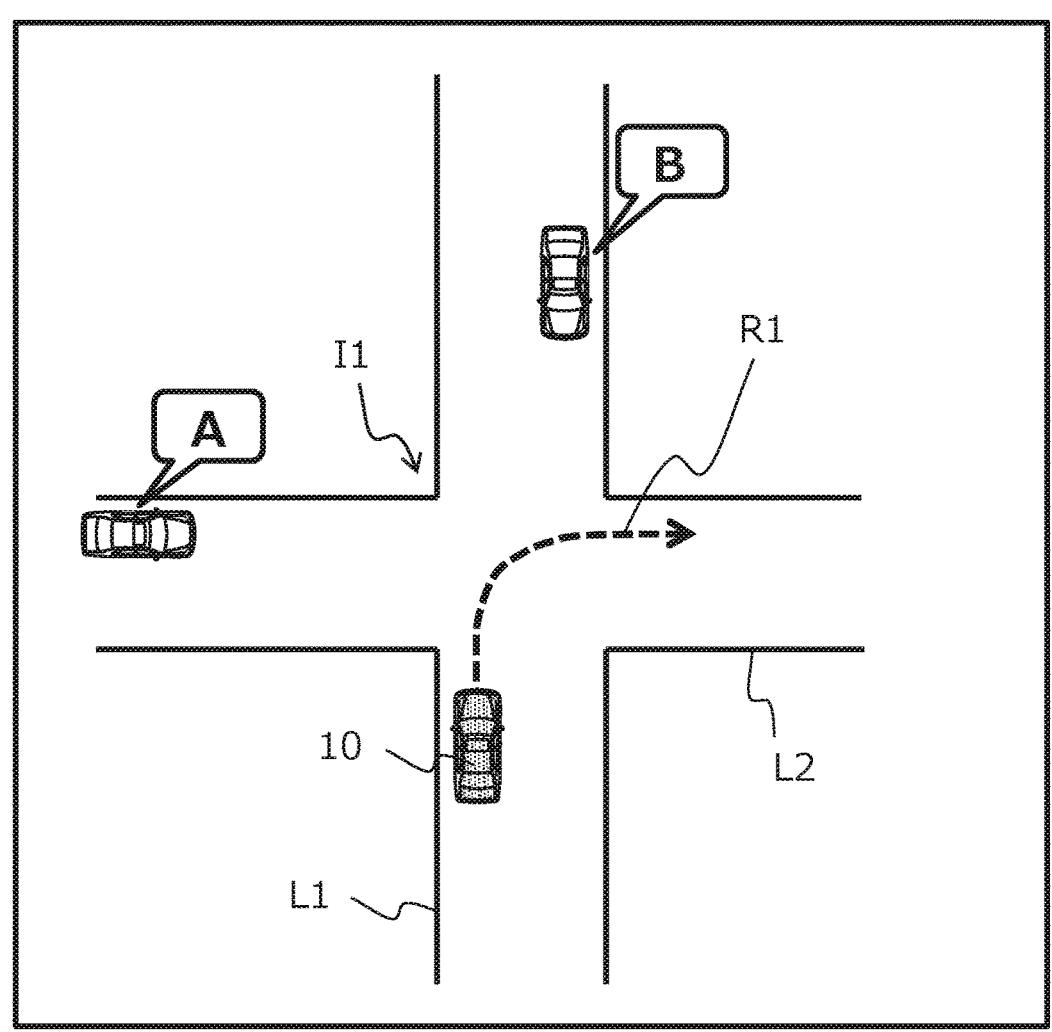
FIG. 4 is a diagram illustrating an example of display information displayed on a display of a remote operator interface.

Therefore, the remote support system 100 according to the first embodiment receives designation of a vehicle that is a target of passage determination with respect to the vehicle 10 from the remote operator. This process is hereinafter referred to as "reception process". FIG. 4 is a diagram illustrating an example of display information displayed on a display device 62 of a remote operator interface 6. In this figure, the vehicle 10, the other vehicle marked with "A" as identification information, and another vehicle marked with "B" as identification information, are represented on the overhead view of the intersection I1. In addition, a target route R1 at the intersection I1 of the vehicle 10 is also illustrated on the overhead view.

Figure 5:
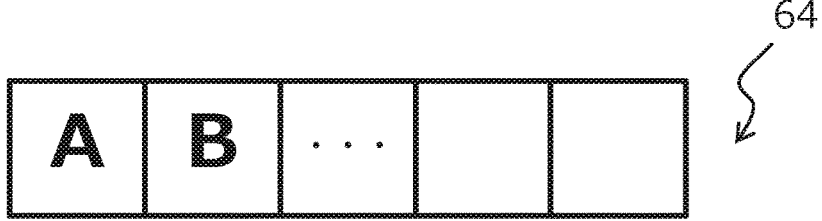
FIG. 5 is a diagram illustrating an example of an input device of the remote operator interface.

In the reception process, the remote operator refers to the overhead view displayed on the display device 62, and designates a preceding passing vehicle that is to be a reference for start permission when the vehicle 10 turn right the intersection I1 according to the target path R1. In the following description, this vehicle is referred to as a "starting reference vehicle". FIG. 5 is a diagram illustrating an example of an input device of a remote operator interface. In the example shown in this figure, the input device 64 is provided with buttons corresponding to symbols as identification information attached to other vehicles displayed on the display device 62. The remote operator presses a button with a symbol of a vehicle to be a starting reference. In the example shown in FIG. 4, it is necessary to wait not only for the vehicle "B" traveling the opposite lane of the lane L1 toward the intersection I1 to pass, but also for the vehicle "A" traveling the lane L2 from the left side of the vehicle 10 toward the intersection I1 to pass. Therefore, the remote operator presses the button "A". Information of the starting reference vehicle designated by the remote operator is hereinafter referred to as "starting reference information INF2". The starting reference information INF2 is transmitted to the vehicles 10 as a remote instruction. When the starting reference vehicle included in the received remote instruction has passed through the intersection I1, the vehicle 10 starts to turn right at the intersection I1.

According to such an operation, the remote operator can complete the remote support without waiting for the passage of the intersection of the starting reference vehicle. This makes it possible to shorten the constraint time of the operator than in the case of instructing the start timing.

Hereinafter, the functional configuration and specific processing of the autonomous driving control device 40 of the remote support system 100 according to the first embodiment will be described.

1-4. Functional Configuration of Autonomous Driving Device

Figure 6:
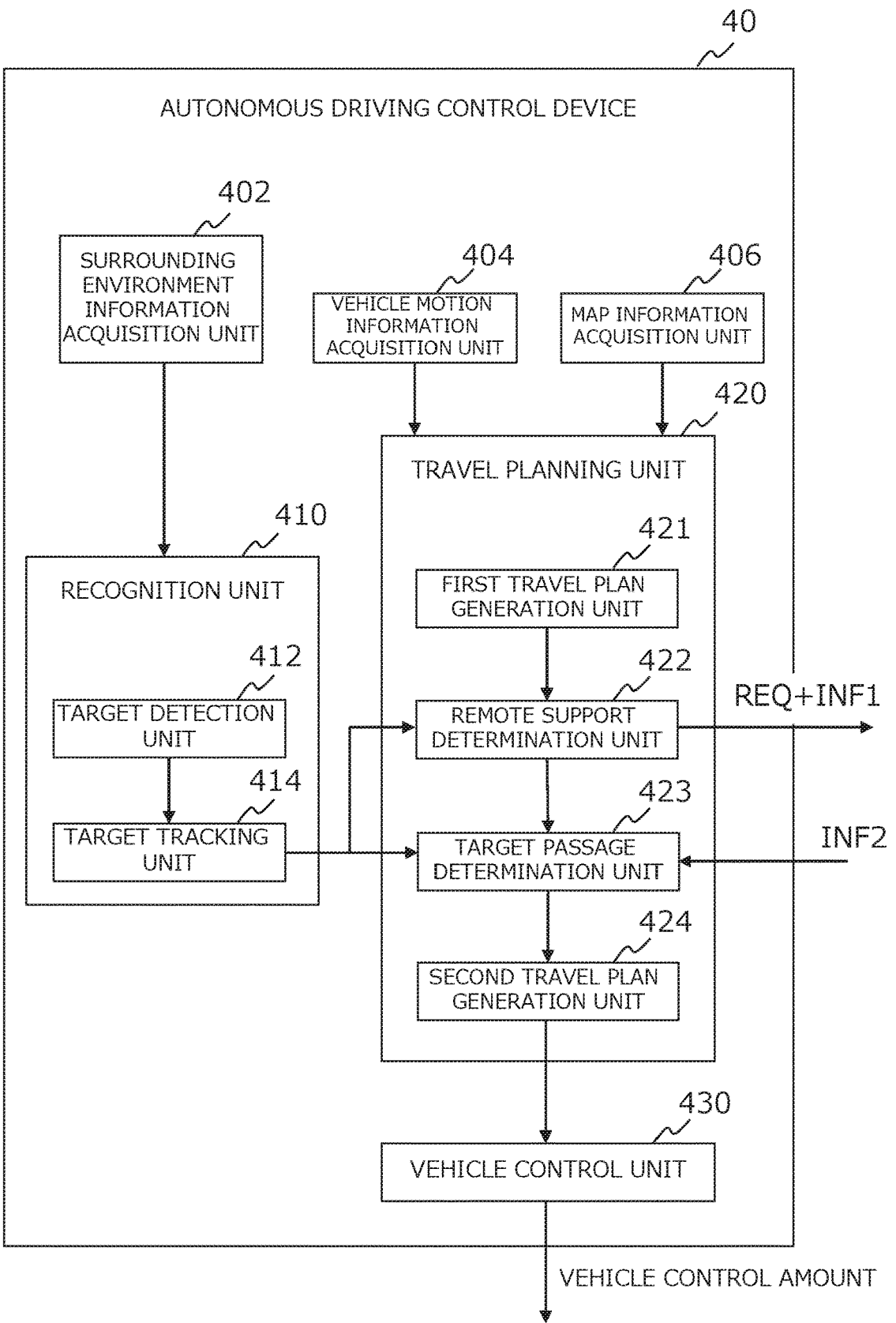
FIG. 6 is a functional block diagram showing a part of functions of the autonomous driving control device according to the first embodiment.

Next, an example of a functional configuration of the autonomous driving control device 40. FIG. 6 is a functional block diagram showing a part of the functions of the autonomous driving control device 40. The autonomous driving control device 40 includes a surrounding environment information acquisition unit 402, a vehicle motion information acquisition unit 404, a map information acquisition unit 406, a recognition unit 410, a travel planning unit 420, and a vehicle control unit 430.

The surrounding environment information acquisition unit 402 and the vehicle motion information acquisition unit 404 are functional blocks for respectively acquiring the surrounding environment information and the vehicle motion information detected by the information acquisition device 30. The map information acquisition unit 406 is a function block for acquiring map information stored in the map database 444.

The recognition unit 410 is a functional block for recognizing a target such as a vehicle or a pedestrian, present around the vehicle 10. The recognition unit 410 includes a target detection unit 412 and a target tracking unit 414. The target detection unit 412 detects a target around the vehicle 10 using the surrounding environment information acquired by the surrounding environment information acquisition unit 402 and the vehicle motion information acquired by the vehicle motion information acquisition unit 404. Here, the target detection method is not limited.

The target tracking unit 414 associates the previous detection result and the current detection result obtained by the target detection unit 412 with each other. Typically, when the target of the current detection result is the same as that of the previous detection result, the target tracking unit 414 assigns the same target ID as that of the previous detection result. When the target of the current detection result is different from the previous detection result, the target tracking unit 414 assigns a new target ID to the target of the current detection result. The assigned target ID is transmitted to the travel planning unit 420 as target ID information together with information such as a position, and a speed.

The travel planning unit 420 is a functional block for generating a traveling plan for autonomous driving of the vehicle 10. The travel planning unit 420 includes a first travel plan generation unit 421, a remote support determination unit 422, a target passage determination unit 423, and a second travel plan generation unit 424.

The first travel plan generation unit 421 generates a traveling trajectory TR1 for the vehicle 10 to travel according to the map using the map information acquired by the map information acquisition unit 406 and the vehicle motion information such as the current position and the vehicle speed of the vehicle 10 acquired by the vehicle motion information acquisition unit 404. A method of generating the traveling trajectory TR1 is not limited.

The remote support determination unit 422 determines whether remote support by the remote operator is necessary. The remote support here is a passage determination for the vehicle 10 to pass through a predetermined area. Typically, the remote support determination unit 422 generates a predicted trajectory TR2 of one or more avoidance target vehicles having a possibility of collision with the vehicle 10 using the target ID information transmitted from the target tracking unit 414.

The remote support determination unit 422 calculates the predicted collision position CP where the predicted trajectory TR2 and the traveling trajectory TR1 intersect each other. The remote support determination unit 422 determines whether there is a possibility that the vehicle 10 collides with the avoidance target vehicle based on the predicted collision position CP. When the predicted collision position CP does not exist, the remote support determination unit 422 determines that the remote support request is unnecessary. When the predicted collision position CP is present, the remote support determination unit 422 determines the traffic priority situation at the predicted collision position CP by using the map information or the surrounding environment information. When the traffic priority situation at the predicted collision position CP is a priority situation of the vehicle 10, the remote support determination unit 422 determines that the remote support request is unnecessary. When the traffic priority situation at the predicted collision position CP is a situation in which the vehicle 10 is not prioritized, the remote support determination unit 422 determines that the remote support request is necessary.

When it is determined that the remote support request is necessary, the remote support determination unit 422 transmits the remote support request REQ and the display information INF1 to the remote support device 2. The display information INF1 is information necessary for the remote operator to perform a remote instruction, and is, for example, information in which the vehicle 10, the traveling trajectory TR1 of the vehicle 10, and the avoidance target vehicles are arranged on an overhead view.

In response to the remote support request REQ, the remote operator designates the starting reference vehicle from the input device 64 while referring to the display information INF1 displayed on the display device 62. The remote support device 2 transmits the target object ID information corresponding to the designated starting reference vehicle to the target passage determination unit 423 as the starting reference information INF2.

The target passage determination unit 423 executes a determination process of determining whether the starting reference vehicle designated by the remote operator has passed through the predetermined area. Typically, the target passage determination unit 423 identifies the starting reference vehicle based on the starting reference information INF2 received from the remote support device 2 and the target ID information transmitted from the target tracking unit 414, and determines whether the starting reference vehicle has passed through the predetermined area. The determination result is transmitted to the second travel plan generation unit 424.

The second travel plan generation unit 424 generates the traveling trajectory TR3 based on the travel plan that is stopped at the predetermined standby position SP when the determination result that the vehicle target of the starting reference has not passed through the predetermined area is received. The predetermined standby position SP here is a position where the vehicle 10 waits for an instruction from the remote operator, for example, and is exemplified by a position of a stop line in front of the intersection, for example. Alternatively, when the vehicle target of the starting reference is determined to have passed through the predetermined area, the second travel plan generation unit 424 generates a traveling trajectory TR4 based on the travel plan in which the vehicle target starts and passes through the predetermined area. The generated traveling trajectory TR3 or TR4 is transmitted to the vehicle control unit 430.

The vehicle control unit 430 calculates the travel control amount related to steering, acceleration, and deceleration of the vehicle 10 for realizing the traveling trajectory TR1, TR3 or TR4. The calculated travel control amount is output to the traveling device 60. The processing executed by the second travel plan generation unit 424 and the vehicle control unit 430 is hereinafter referred to as "vehicle control process". The traveling device 60 controls the travel of the vehicle 10 according to the travel control amount calculated by the vehicle control process.

1-5. Specific Processing Executed by Autonomous Driving Control Device

Figure 7:
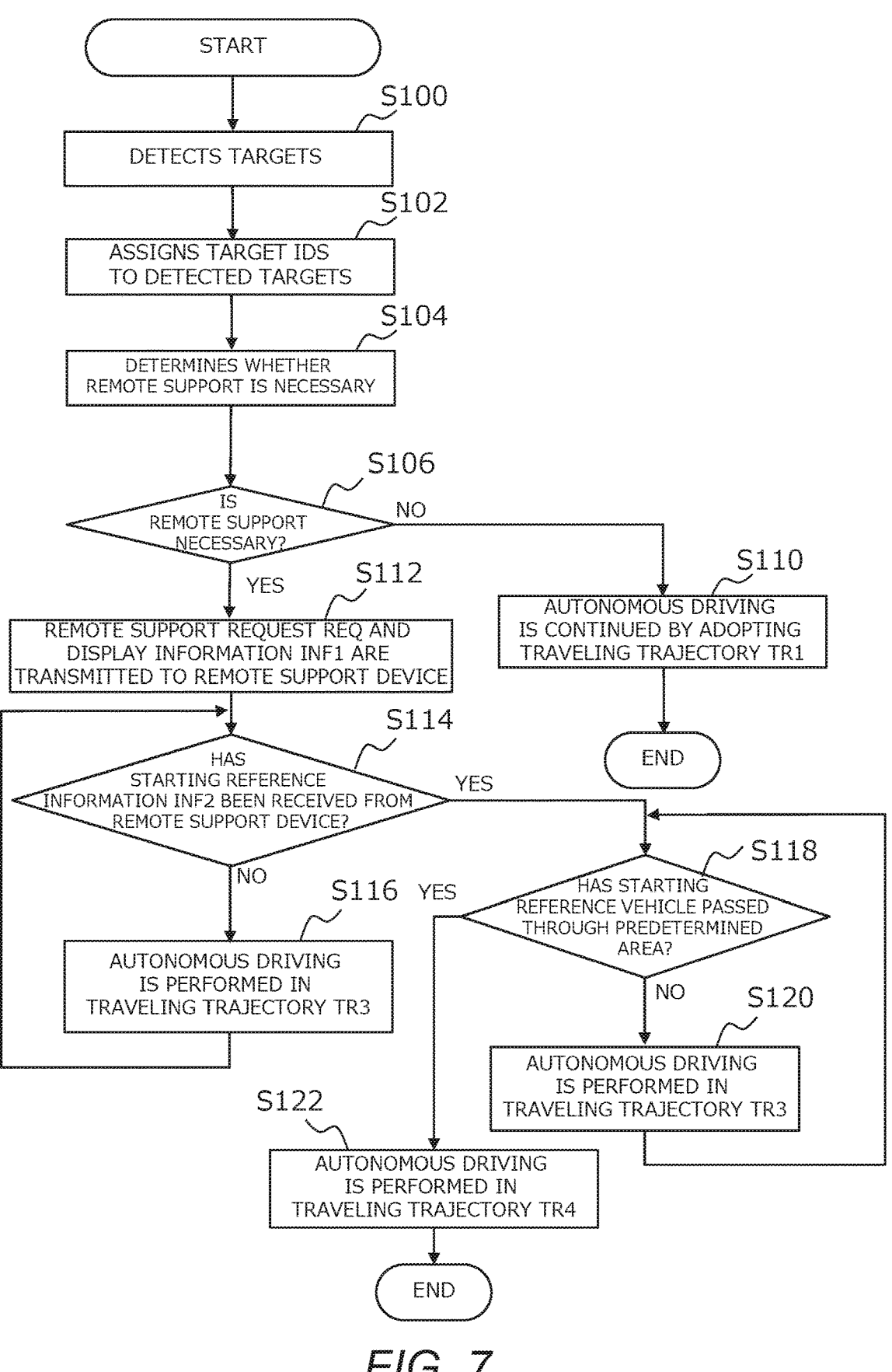
FIG. 7 is a flowchart of a process executed in the autonomous driving control device according to the first embodiment.

FIG. 7 is a flowchart of a process executed in the autonomous driving control device 40. The routine illustrated in FIG. 7 is executed by the processor 42 of the autonomous driving control device 40 executing the program 440 stored in the storage device 44 during the autonomous driving of the vehicle 10.

In step S100 of the routine shown in FIG. 7, first, the target detection unit 412 detects targets around the vehicle 10. In the next step S102, the target tracking unit 414 assigns target IDs to the targets detected in step S100. When the process of step S102 is performed, the process proceeds to step S104.

Figure 8:
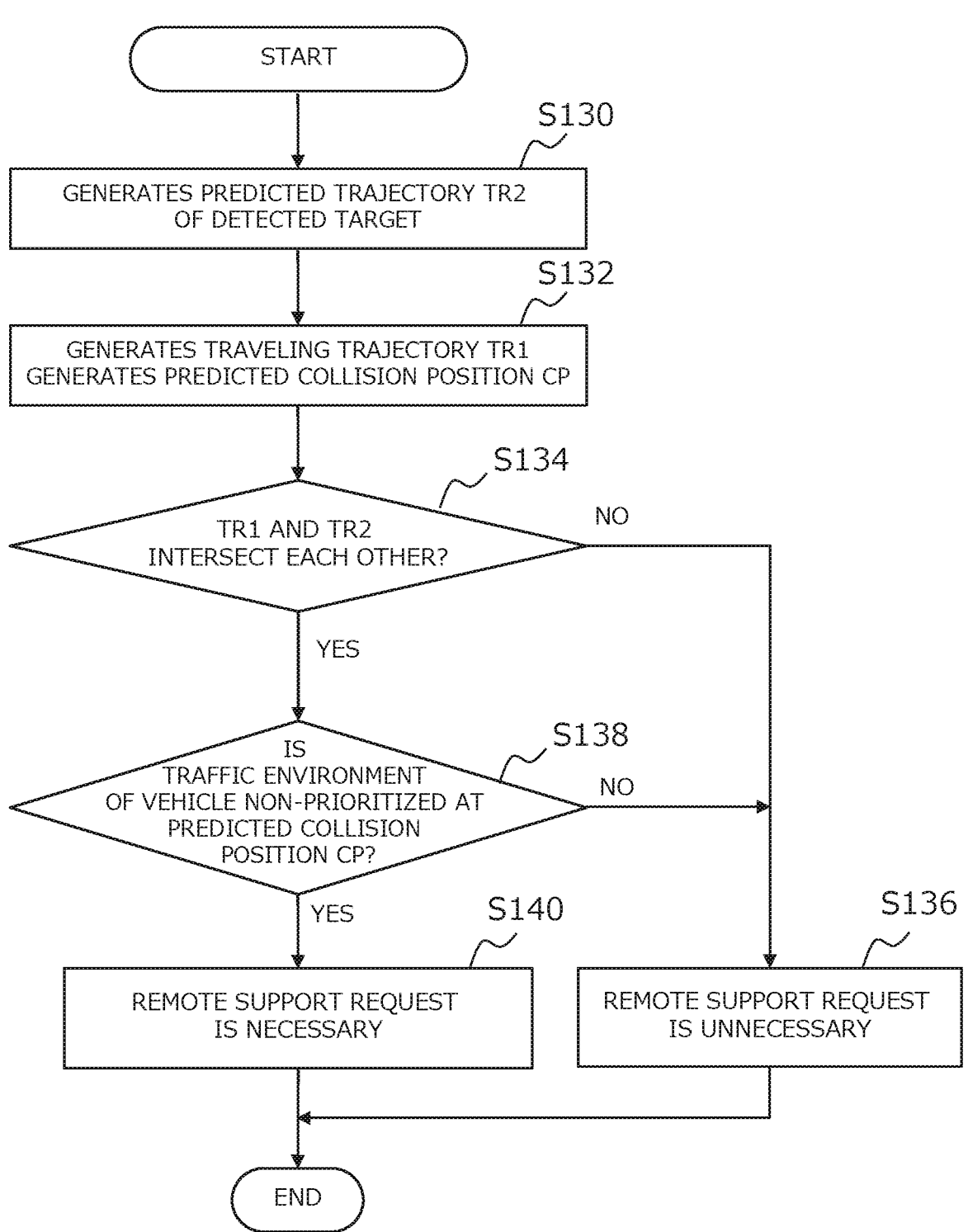
FIG. 8 is a flowchart illustrating a routine of a remote support determination process performed by a remote support determination unit.

In step S104, the remote support determination unit 422 determines whether remote support is necessary. FIG. 8 is a flowchart showing a routine of a remote support necessity determination process performed by the remote support determination unit 422. In step S104, the routine shown in FIG. 8 is executed.

In step S130 of the routine shown in FIG. 8, a predicted trajectory TR2 of the detected target is generated. In the next step S132, a predicted collision position CP in which the traveling trajectory TR1 of the vehicle 10 generated in the first travel plan generation unit 421 and the predicted trajectory TR2 of the detected target generated in step S130 intersect is calculated. In the next step S134, it is determined whether the traveling trajectory TR1 and the predicted trajectory TR2 intersect each other. Here, it is determined that the traveling trajectory TR1 and the predicted trajectory TR2 intersect when the valid predicted collision position CP is calculated in step S132.

In the process of step S134, when it is determined that the traveling trajectory TR1 and the predicted trajectory TR2 do not intersect with each other, the process proceeds to step S136, and the remote support request is determined to be unnecessary.

On the other hand, in the process of step S134, when it is determined that the traveling trajectory TR1 and the predicted trajectory TR2 intersect with each other, the process proceeds to step S138. In step S138, based on the map information and the predicted collision position CP, it is determined whether the traffic environment of the vehicle 10 with respect to the detected target is non-prioritized at the predicted collision position CP. As a result, when the vehicle 10 is non-prioritized at the predicted collision location, the process proceeds to step S140, and it is determined that the remote support request is necessary. On the other hand, when the vehicle 10 is not non-prioritized, the process proceeds to step S136, and it is determined that the remote support request is not necessary.

Returning to the flow chart shown in FIG. 7, in the process of step S106, it is determined whether the remote support is necessary. Here, in the processing of the flowchart illustrated in FIG. 8, it is determined whether the remote support request is determined to be necessary. As a result, when it is determined that the remote support request is unnecessary, the process proceeds to step S110. In step S110, the autonomous driving of the vehicle 10 is continued by adopting the traveling trajectory TR1 of the vehicle 10 generated in the first travel plan generation unit 421. When the process of step S110 is performed, the routine is terminated.

On the other hand, in the process of step S106, when it is determined that the remote support is necessary, the process proceeds to step S112. In step S112, the remote support request REQ and the display information INF1 are transmitted to the remote support device 2. In the remote support device 2, the display information INF1 is displayed on the display device 62. The remote operator designates the starting reference vehicles from the input device 64 by referring to the display information INF1 displayed on the display device 62. The remote support device 2 transmits the starting reference information INF2 including the target ID information corresponding to the designated vehicles to the target passage determination unit 423.

In step S114, it is determined whether the starting reference information INF2 has been received from the remote support device 2. As a result, when the starting reference information INF2 has not yet been received, the process proceeds to step S116, and when the starting reference information INF2 has been received, the process proceeds to step S118. In step S116, the autonomous driving of the vehicle 10 is performed in a traveling trajectory TR3 based on the traveling plan that is stopped at a predetermined standby position SP and waits, which is generated in the second travel plan generation unit 424. When the process of S116 is performed, the process returns to step S114.

In step S118, it is determined whether the starting reference vehicle has passed through the predetermined area. As a result, when the starting reference vehicle has not yet passed through the predetermined area, the process proceeds to step S120, and when the starting reference vehicle has passed through the predetermined area, the process proceeds to step S122.

In step S120, similarly to the process of step S116, the autonomous driving of the vehicle 10 is performed in the traveling trajectory TR3 based on the traveling plan in which the vehicle is stopped at the predetermined standby position SP and waits. When the process of step S120 is executed, the process returns to step S118.

In step S122, in the second travel plan generation unit 424, the vehicle control amount for realizing the traveling trajectory TR4 is calculated. The calculated vehicle control amount is sent to the traveling device 60. The traveling device 60 performs autonomous driving of the vehicle 10 according to the vehicle control amount. As a result, the vehicle 10 passes through the predetermined area.

As described above, according to the remote support system 100 of the first embodiment, when the vehicle 10 is in a situation requiring remote support, the remote operator only instructs the starting reference vehicle and does not need to instruct the start timing of the vehicle 10. As a result, the constraint time of the remote operator can be reduced, thereby reducing the burden on the remote operator.

1-6. Application Example to Specific Traffic Environment Situation

The remote support system 100 of the first embodiment is applicable in various traffic environment situations. Hereinafter, application examples of the predetermined area and the predetermined standby position in several traffic environment situations will be described.

1-6-1. 1st Application Example

Figures 9, 10:
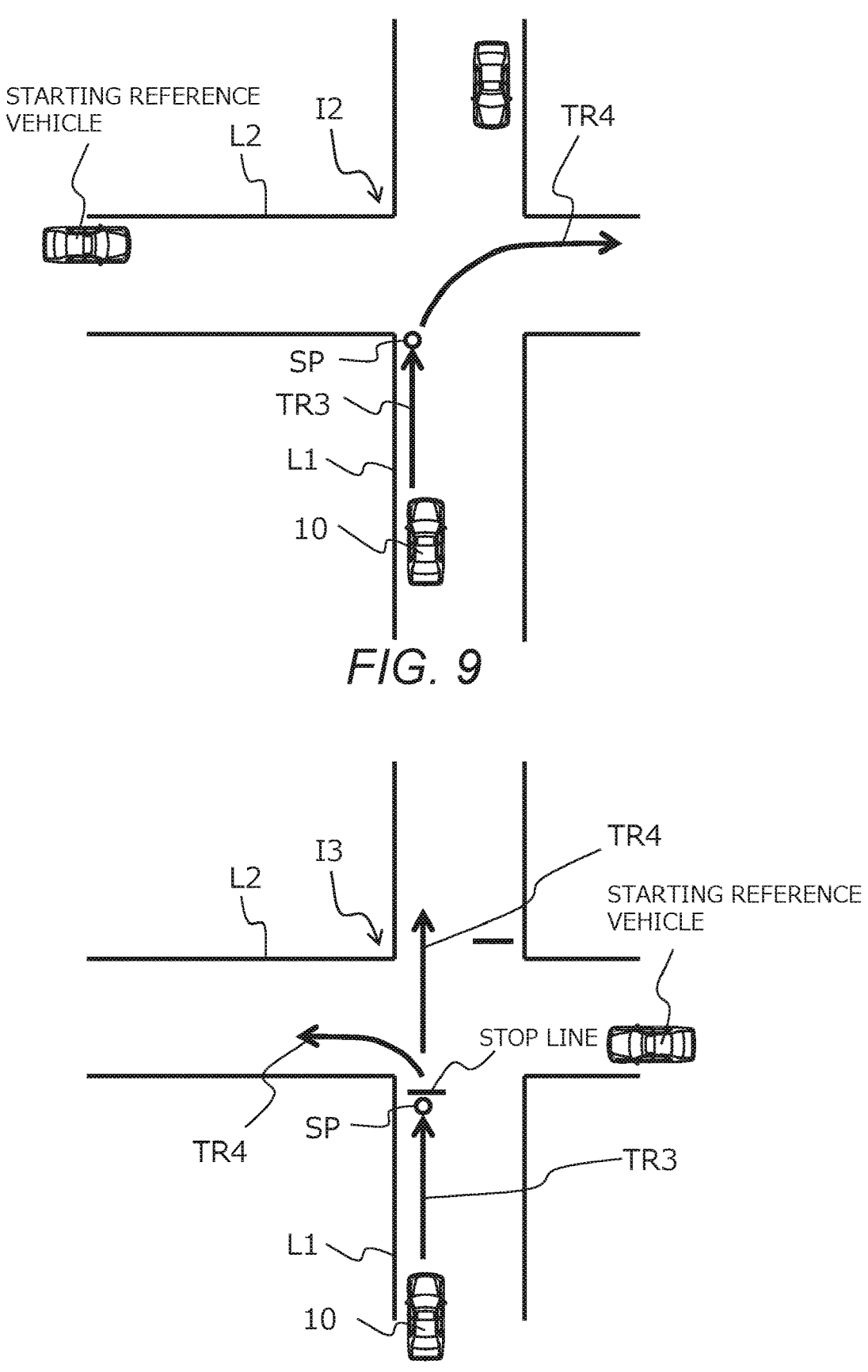
FIG. 9 is a diagram illustrating a first application example of the remote support system.
FIG. 10 is a diagram illustrating a second application example of the remote support system.

FIG. 9 is a diagram illustrating a first application example of the remote support system. In FIG. 9, an intersection 12 where a lane L1 and a lane L2 intersect with each other and the vehicle 10 traveling in the lane L1 are illustrated. The vehicle 10 is scheduled to turn right at the intersection 12. In the first application example, the predetermined area is the intersection 12, the predetermined standby position SP is a position in front of the intersection 12 in the lane L1. The autonomous driving control device 40 transmits the remote support request REQ to the remote support device 2, and performs autonomous driving according to the traveling trajectory TR3 for waiting in front of the intersection. Then, when the starting reference vehicle instructed by the remote operator passes through the intersection 12, the vehicle 10 performs autonomous driving according to the traveling trajectory TR4 for turning right at the intersection 12.

1-6-2. Second Application Example

FIG. 10 is a diagram illustrating a second application example of the remote support system. In FIG. 10, an intersection 13 where a lane L1 and a lane L2 intersect with each other, and the vehicle 10 traveling in the lane L1 is illustrated. The Lane L2 is a priority lane with respect to the lane L1. For this reason, a stop line is provided on the lane L1 in front of the intersection 13. The vehicle 10 is scheduled to turn left or travel straight at the intersection 13. In the second application example, a predetermined area is the intersection 13, a predetermined standby position SP is the position of the stop line in front of the intersection in the lane L1. The autonomous driving control device 40 transmits the remote support request REQ to the remote support device 2, and performs autonomous driving according to the traveling trajectory TR3 for waiting at the primary stop line of the intersection 13. Then, when the starting reference vehicle instructed by the remote operator passes through the intersection 13, the vehicle 10 performs autonomous driving in accordance with the traveling trajectory TR4 goes straight or turns left in the intersection 13.

1-6-3. Third Application Example

Figure 11:
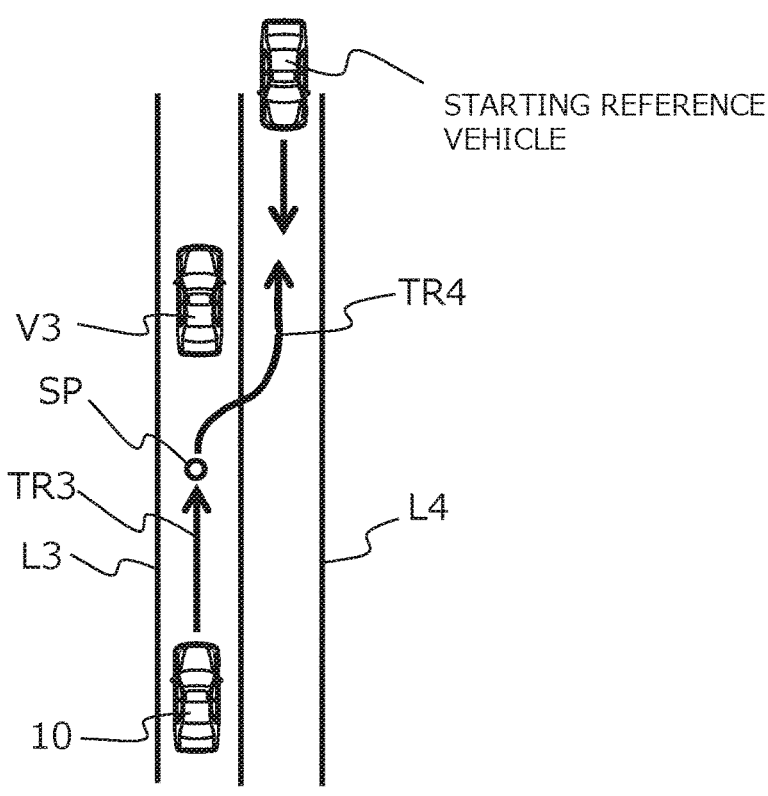
FIG. 11 is a diagram illustrating a third application example of the remote support system.

FIG. 11 is a diagram illustrating a third application example of the remote support system. In FIG. 11, a lane L3, a lane L4 adjacent to the lane L3, a parked vehicle V3 parked in the lane L3, the vehicle 10 approaching from behind of the parked vehicle V3 by traveling in the lane L3 is illustrated. The vehicle 10 is scheduled to avoid the parked vehicle V3 beyond the lane from the lane L3 to the lane L4 side. In the third application example, a predetermined area is the parking area of the parked vehicle V3, a predetermined standby position SP is a position behind the parked vehicle V3. The autonomous driving control device 40 transmits the remote support request REQ to the remote support device 2, and performs autonomous driving according to the traveling trajectory TR3 for waiting at a position behind the parked vehicle V3. Then, when the starting reference vehicle instructed by the remote operator passes through the parking area of the parked vehicle V3, the vehicle 10 performs autonomous driving according to the traveling trajectory TR4 to avoid the parked vehicle V3 beyond the lane to the lane L4 side.

1-6-4. Fourth Application Example

Figure 12:
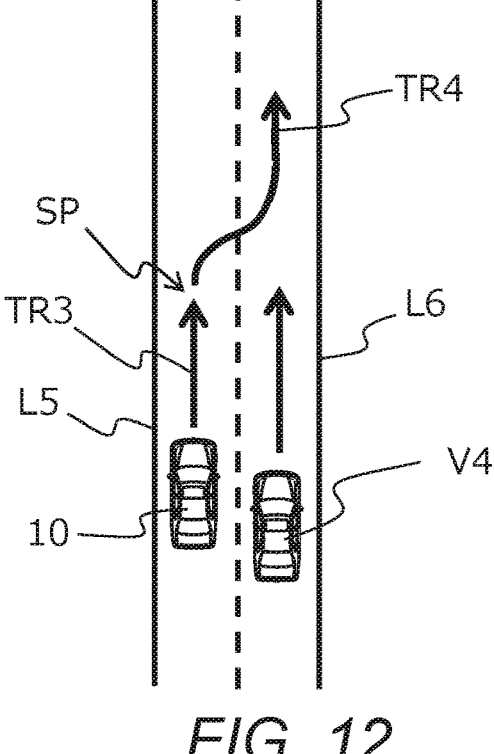
FIG. 12 is a diagram illustrating a fourth application example of the remote support system.

FIG. 12 is a diagram illustrating a fourth application example of the remote support system. In FIG. 12, a lane L5, a lane L6 adjacent to lane L5 in the same direction, a vehicle 10 traveling in the lane L5, and a vehicle V4 traveling in the lane L6. The vehicle 10 is scheduled to lane change to the lane L6. In the fourth application example, the predetermined area is the area of the vehicle 10, the predetermined standby position SP is the lane L5. The autonomous driving control device 40 transmits the remote support request REQ to the remote support device 2 in the lane L5, and performs autonomous driving according to the traveling trajectory TR3 for continuing the traveling of the lane L5. Then, when the starting reference vehicle instructed by the remote operator is the vehicle V4, when the vehicle V4 passes over the vehicle 10, the vehicle 10 performs autonomous driving according to the traveling trajectory TR4 for performing lane change to the lane L6 side.

1-6. Modification Example

The remote support system 100 of the first embodiment may adopt the following modified form. Note that the following modification can also be applied to a remote support system of s second embodiment described later.

There is no limitation on the functional arrangement of the autonomous driving control device 40. That is, part or all of the functions of the autonomous driving control device 40 may be mounted on the vehicle 10 or may be disposed in the remote server 4 of the remote support device 2. This modification can also be applied to the remote support system of a second embodiment described later.

The method of determining whether the remote support is necessary in step S106 is not limited. That is, the remote support determination unit 422 may determine whether the remote support is necessary by using not only the method based on the routine illustrated in FIG. 8 but also other known methods.

In the display process, the display form of the display information INF1 displayed on the display device 62 is not limited to the overhead view. That is, for example, the display information INF1 may be information in which the vehicle 10, the traveling trajectory TR1 of the vehicle 10, and one or more avoidance target vehicles to which numbers or symbols as identification information are attached are arranged in a camera image capturing the front of the vehicles 10. The identification information attached to the avoidance target vehicle is not limited to a number or a symbol, and may be identified by a color or the like.

Figure 13:
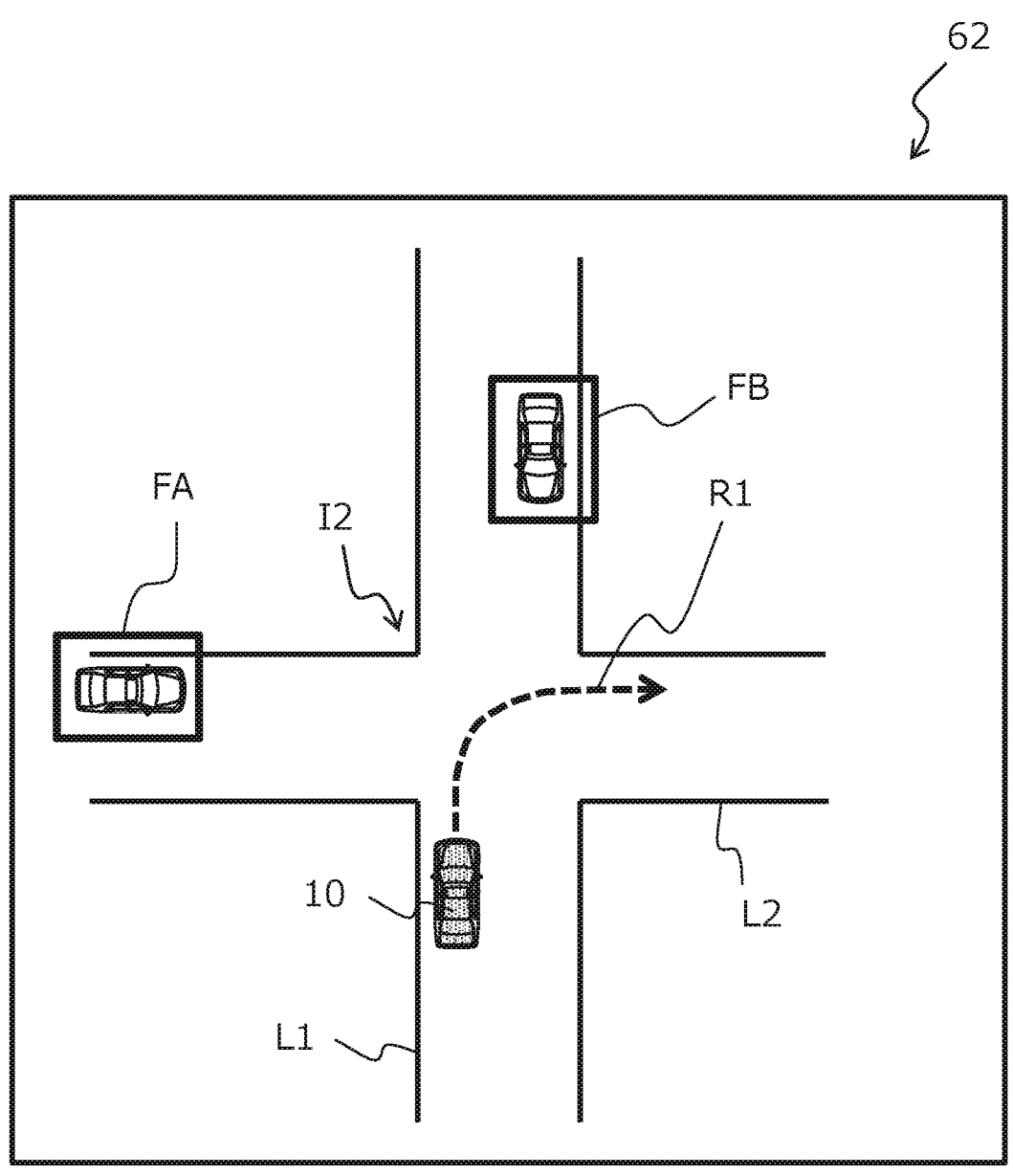
FIG. 13 is a diagram illustrating a modification of q display form of display information INF1.

FIG. 13 is a diagram illustrating a modification of the display form of the display information INF1. As shown in this figure, when the display device 62 is a touch panel display in which the input device 64 is integrally configured, the display information INF1 displayed on the display may be configured to be selectable by a touch operation. In this case, for example, if the rectangular areas FA and FB surrounding the avoidance vehicles are set as selectable areas, there is no need to assign numbers or symbols to the avoidance vehicles.

In the reception process, the input device 64 is not limited to a configuration in which a number or a symbol assigned to the avoidance target vehicle is selected as illustrated in FIG. 5. That is, the display information INF1 may include a confirmation message indicating "We will pass after the vehicle A passes, is it OK?" together with the overhead view or the camera-image. In this case, the input device 64 may be configured to be able to input a response of "YES" or "NO" to the confirmation message. When the remote operator inputs a "NO" response to the confirmation message, the autonomous driving control device 40 may be configured to generate a display information INF1 including a confirmation message regarding another avoidance object. According to such a configuration, the remote operator can instruct the starting reference vehicle by responding "YES" or "NO" to the confirmation message.

When the display information INF1 includes a camera image, an undetected target at a long distance may be included in the camera image. Such an undetected target may be configured to be selectable by a remote operator by attaching an identification mark to the undetected target at the time when the recognition unit 410 of the autonomous driving control device 40 recognizes the undetected target.

Second Embodiment

Next, a remote support system 100 according to a second embodiment will be described. The remote support system 100 according to the second embodiment has a common configuration with the remote support system 100 according to the first embodiment except for the functional configuration of the autonomous driving control device 40. A description of elements common to the remote support system 100 according to the first embodiment will be omitted.

Figures 14, 15:
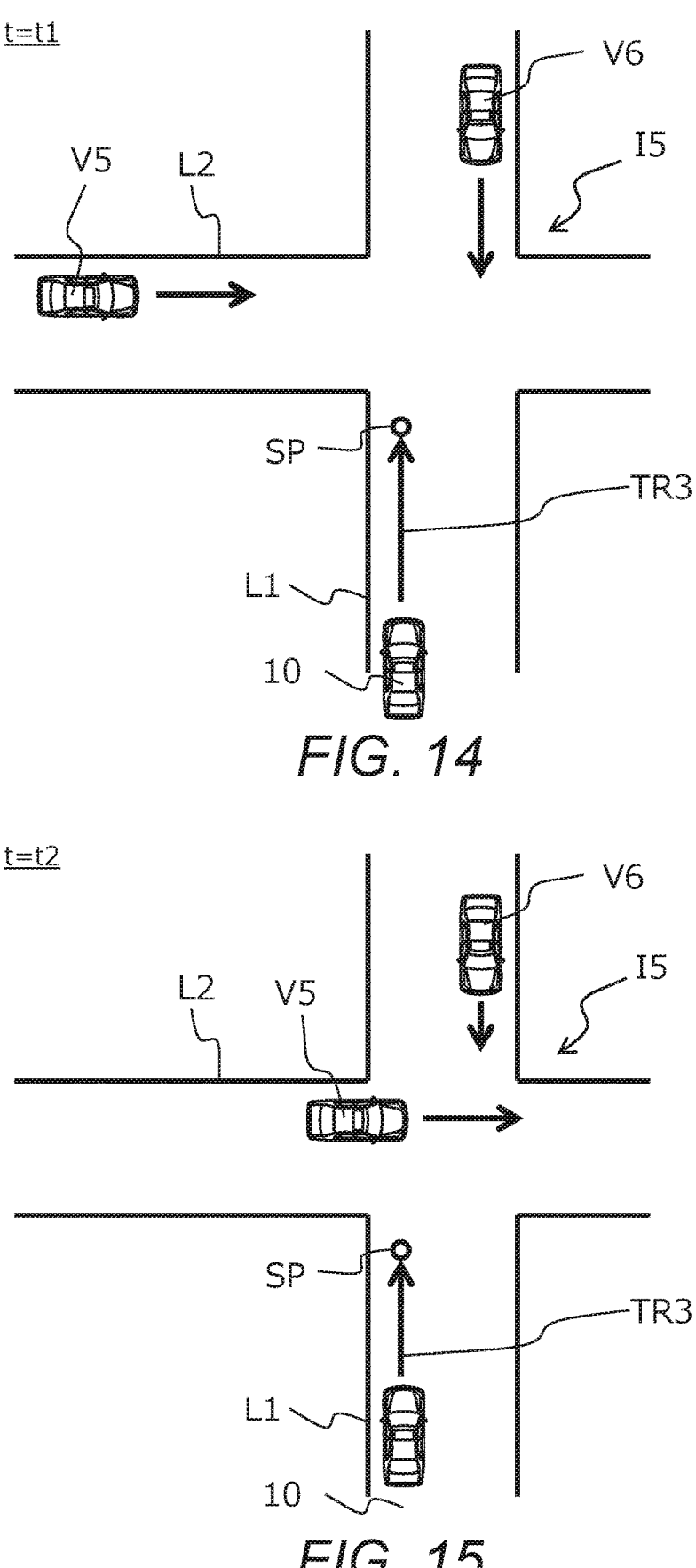
FIG. 14 is a diagram for explaining features of the remote support system according to a second embodiment.
FIG. 15 is a diagram for explaining features of the remote support system according to the second embodiment.
Figure 16:
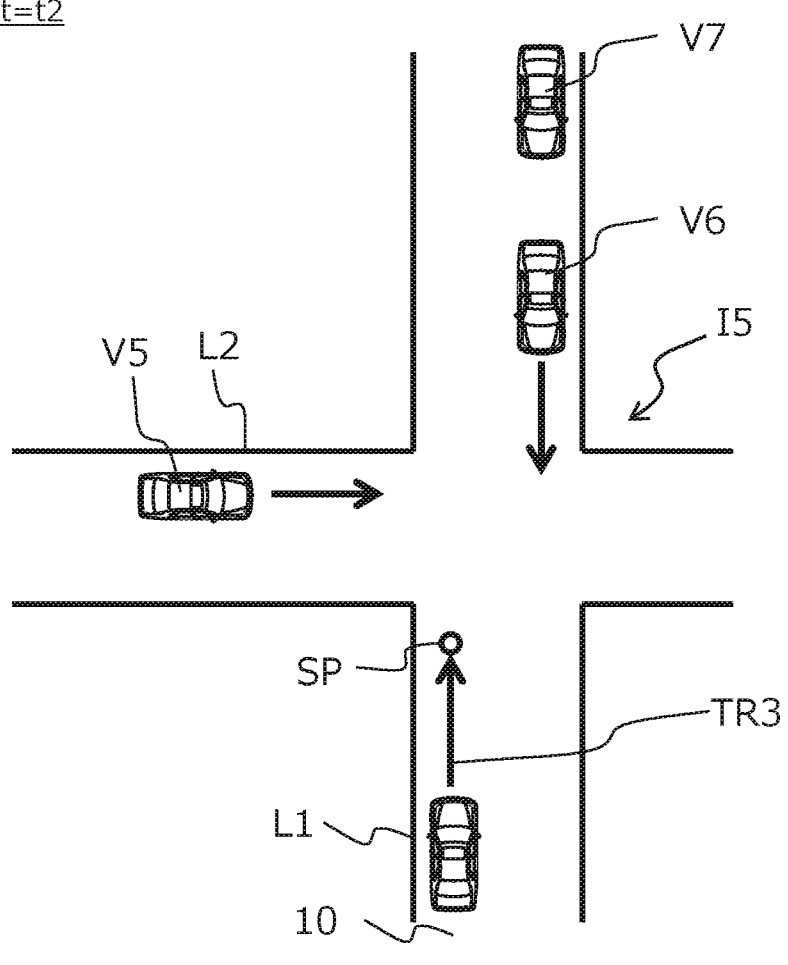
FIG. 16 is a diagram for explaining features of the remote support system according to the second embodiment.

2-1. Features of Autonomous Driving Control Device 40 According to Second Embodiment FIGS. 14, 15, and 16 are diagrams for explaining features of the remote support system according to the second embodiment. FIG. 14 illustrates an intersection 15 where a lane L1 and a lane L2 intersect with each other, the vehicle 10 that travels in the lane L1 at time t=t1, an avoidance target vehicle V5 that travels in the lane L2 from the left side of the vehicle 10 toward the intersection 15, and an avoidance target vehicle V6 that travels in the opposite lane of the lane L1 toward the intersection 15. The vehicle 10 is scheduled to turn right at the intersection IS. In this application example, the predetermined area is the intersection IS, the predetermined standby position SP is a position in front of the intersection IS in the lane L1. In passing through the predetermined area, the vehicle 10 needs to wait not only for the vehicle V6 but also for the vehicle V5 to pass through.

The autonomous driving control device 40 transmits the remote support request REQ to the remote support device 2, and performs autonomous driving according to the traveling trajectory TR3 for waiting in front of the intersection. Then, when the starting reference vehicle instructed by the remote operator is the avoidance target vehicle V5, the vehicle 10 turns right at the intersection 15 after the avoidance target vehicle V5 passes through the intersection 15.

FIG. 15 illustrates the vehicle 10 traveling in the lane L1, the avoidance target vehicle V5 traveling in the lane L2 from the left side of the vehicle 10 toward the intersection 15, and the avoidance target vehicle V6 traveling in the opposite lane of the lane L1 toward the intersection IS at a time t=t2 of a few seconds after the time t=t1. In the example shown in FIG. 15, a situation is depicted in which the avoidance target vehicle V6 is decelerated with concern to the avoidance target vehicle V5, and the avoidance target vehicle V5 is a state of being accelerated. In such a case, since the passing order of the avoidance target vehicles V5 and V6 passing through the intersection IS as the predetermined area is replaced, it is necessary to newly re-designate the starting reference vehicle.

In FIG. 16, at a time t=t2 of a few seconds after the time t=t1, a situation depicts in which an avoidance target vehicle V7, traveling in the opposite lane of the lane L1 toward the intersection IS, newly appears from behind the avoidance target vehicle V6, in addition to the vehicle 10, the avoidance target vehicle V5, and the avoidance target vehicle V6. In such a case, since the avoidance target vehicle V7 is newly added to the passing order of the plurality of avoidance target vehicles passing through the intersection IS as the predetermined area, it is necessary to newly re-designate the starting reference vehicle.

Figure 17:
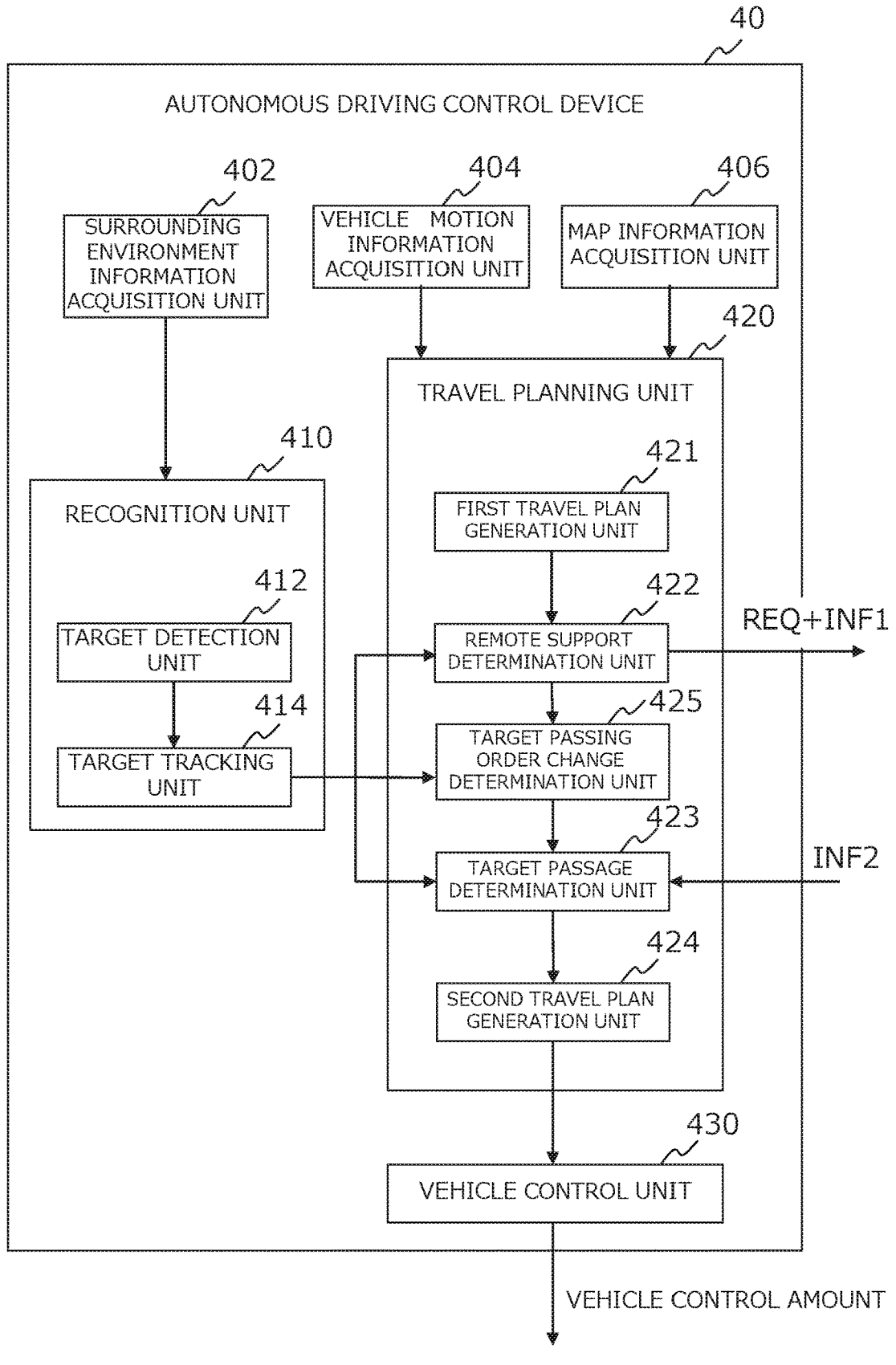
FIG. 17 is a functional block diagram illustrating a part of functions of the autonomous driving control device according to the second embodiment.

The remote support system of the second embodiment further includes a function of determining the predicted passing order of the avoidance target vehicle passing through the predetermined area. FIG. 17 is a functional block diagram illustrating a part of functions of the autonomous driving control device 40 according to the second embodiment. The autonomous driving control device 40 according to the second embodiment includes, in addition to the functions of the autonomous driving control device 40 according to the first embodiment, the travel planning unit 420 further includes a target passing order change determination unit 425.

The target passing order change determination unit 425 calculates a predicted passing order in which the avoidance target vehicle having a possibility of collision with the vehicle 10 passes through the predetermined area using the target ID information sent from the target tracking unit 414. Then, when the target passing order change determination unit 425 determines that there is a change in the predicted passing order calculated last time and the predicted passing order calculated this time, the travel planning unit 420 rejects the starting reference information INF2 transmitted from the target tracking unit 414, and transmits again the display information INF1 and the remote support request REQ based on the new predicted passing order to the remote support device 2.

According to such a process, when a change occurs in the predicted passing order of the plurality of avoidance target vehicles passing through the predetermined area, it is possible to obtain an opportunity to re-designate the passing reference vehicle. As a result, even when an unexpected change occurs in the situation of the plurality of avoidance target vehicles, it is possible to obtain an opportunity to designate an appropriate passing reference vehicle according to the situation.

Figure 18:
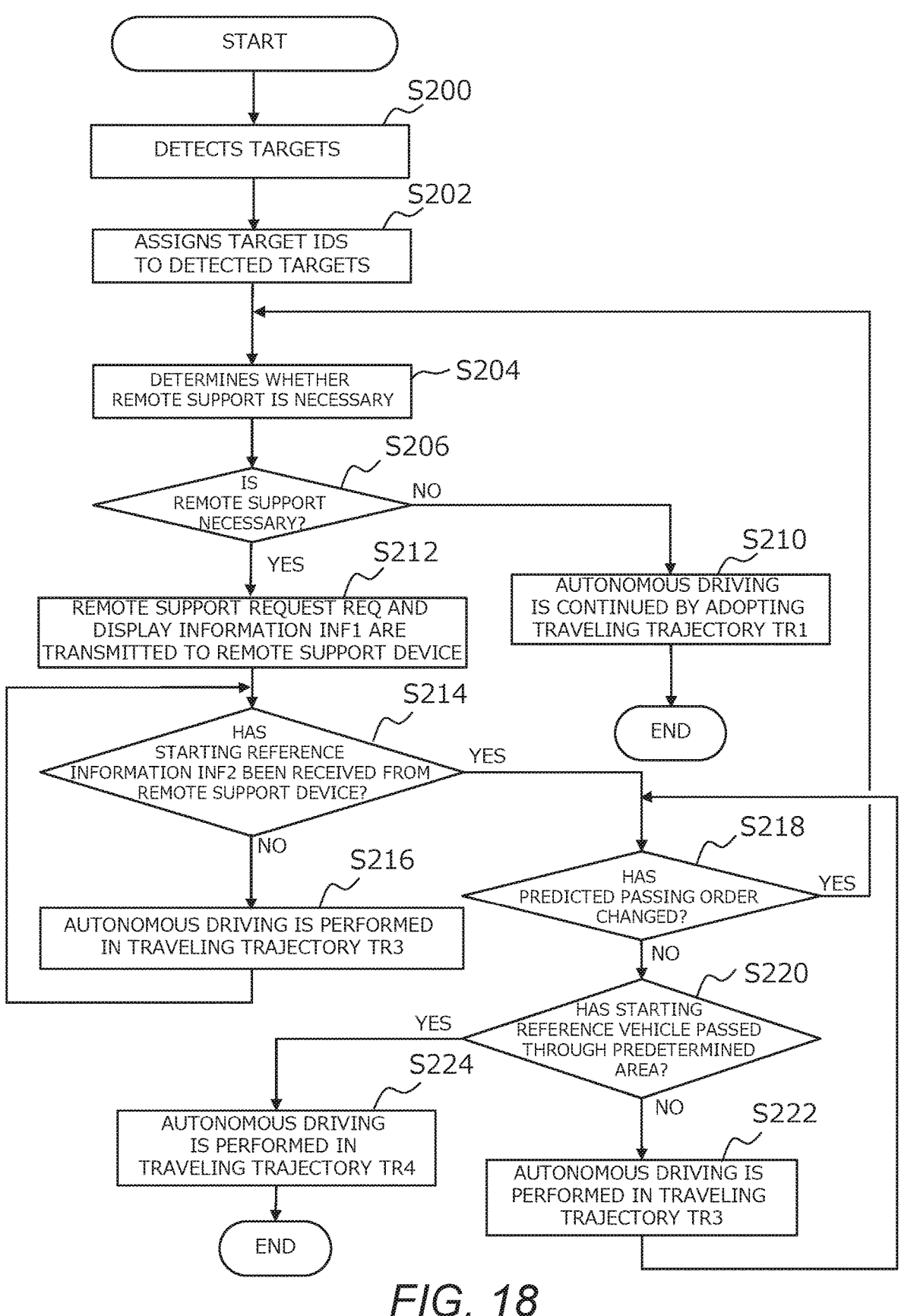
FIG. 18 is a flowchart of process executed by the autonomous driving control device according to the second embodiment.

2-2. Specific Processing Executed by the Autonomous Driving Control Device According to the Second Embodiment FIG. 18 is a flowchart of a process executed in the autonomous driving control device according to the second embodiment. The routine illustrated in FIG. 18 is executed by the processor 42 of the autonomous driving control device 40 executing the program 440 stored in the storage device 44 during the autonomous driving of the vehicle 10, similarly to the routine illustrated in FIG. 7.

In steps S200, S202, S204, S206, S210, S212, S214 and S216 of the routine shown in FIG. 18, the same processes as the steps S100, S102, S104, S106, S110, S112, S114 and S116 of the routine shown in FIG. 7 are executed.

When the starting reference information INF2 is received in the determination of step S214, the process proceeds to step S218. In step S218, the target passing order change determination unit 425 calculates the predicted passing order of the avoidance target passing through the predetermined area. Then, it is determined whether the calculated predicted passing order has changed from the predicted passing order calculated in the process of the previous step S218. When the determination is not accepted, the process proceeds to step S220. On the other hand, when the determination is accepted in S210 process, the starting reference information INF2 received in step S214 is rejected, and then the process returns to step S204.

In step S220, it is determined whether the starting reference vehicle has passed through the predetermined area. As a result, when the starting reference vehicle has not yet passed through the predetermined area, the process proceeds to step S220, and when the starting reference vehicle has passed through the predetermined area, the process proceeds to step S224.

In step S222, the autonomous driving of the vehicle 10 is performed in a traveling trajectory TR3 based on the traveling plan in which the vehicle is stopped at the predetermined standby position SP and waits. When the process of the S220 is executed, the process returns to step S218.

In step S224, in the second travel plan generation unit 424, the vehicle control amount for realizing the traveling trajectory TR4 is calculated. The calculated vehicle control amount is sent to the traveling device 60. The traveling device 60 performs autonomous driving of the vehicle 10 according to the vehicle control amount. As a result, the vehicle 10 passes through the predetermined area.

As described above, according to the remote support system 100 of the second embodiment, when a change occurs in the predicted passing order of the predetermined area of the plurality of avoidance target vehicles, the necessity of the remote support is determined again. Accordingly, since the determination process based on the starting reference vehicle instructed before the change in the predicted passing order is not continued, it is possible to prevent remote support that is not suitable for the situation from being performed.

What is claimed is:

1. A remote support system configured to request a remote operator to perform remote support for passing through a predetermined area, when a vehicle is determined to be in a remote support request situation that a continuation of autonomous driving is difficult due to the vehicle during autonomous driving and one or more avoidance target vehicles approaching each other in the predetermined area, the system comprising:

a first processor associated with the vehicle; and
a second processor associated with a remote server;
wherein the first processor is configured to:
    detect targets around the vehicle;
    determine a trajectory of a first target among the detected targets;
    determine whether a trajectory of the vehicle and the trajectory of the first target intersect;
    upon determination that the trajectory of the vehicle and the trajectory of the first target intersect, determine whether a traffic environment of the vehicle with respect to the first target is non-prioritized at a location where the trajectory of the vehicle and the trajectory of the first target intersect;
    upon determination that the traffic environment of the vehicle and the first target trajectory is non-prioritized at the location where the trajectory of the vehicle and the trajectory of the first target intersect, transmit display information comprising an overhead view of the vehicle and the first target to the remote server;
wherein the second processor is configured to:
    receive the display information;
    display the display information to the remote operator;
    receive a starting reference vehicle selected by the remote operator pressing a button corresponding to the starting reference vehicle to be selected;
    transmit the starting reference vehicle to the vehicle; and
wherein the first processor is configured to:
    receive the starting reference vehicle;
    determine whether the starting reference vehicle has passed through the predetermined area; and
    cause the vehicle to pass through the predetermined area by autonomous driving in case where the system determines that the starting reference vehicle has passed through the predetermined area.

2. The remote support system according to claim 1, wherein the first processor is configured to cause the vehicle to wait at a predetermined waiting position by autonomous driving until the system determines that the starting reference vehicle has passed through the predetermined area.

3. The remote support system according to claim 1, wherein the second processor is configured to:

display each of the one or more avoidance target vehicles in an overhead view together with identification information, and
receive selection of the identification information by the remote operator.

4. The remote support system according to claim 1, wherein the second processor is configured to:

display an overhead view including each of the one or more avoidance target vehicles on a touch panel display, and
receive designation of the starting reference vehicle from the touch panel display.

5. The remote support system according to claim 1, wherein the second processor is configured to:

display a confirmation message specifying any one of the one or more avoidance target vehicles as the starting reference vehicle, and
receive whether the confirmation message is correct.

6. The remote support system according to claim 1, wherein when the vehicle is determined to be the remote support request situation, the first processor is configured to:

calculate predicted passing order in which the one or more avoidance target vehicles pass through the predetermined area, and
cancel reception of the starting reference vehicle in a case where a change occurs in the predicted passing order after the designation of the starting reference vehicle is received.

7. A remote support method for requesting a remote operator to perform remote support for passing through the predetermined area, when a vehicle is determined to be in a remote support request situation that a continuation of autonomous driving is difficult due to the vehicle during autonomous driving and one or more avoidance target vehicles approaching each other in the predetermined area, the remote support method comprising:

detecting targets around the vehicle;
determining a trajectory of a first target among the detected targets;
determining whether a trajectory of the vehicle and the trajectory of the first target intersect;
upon determination that the trajectory of the vehicle and the trajectory of the first target intersect, determining whether a traffic environment of the vehicle with respect to the first target is non-prioritized at a location where the trajectory of the vehicle and the trajectory of the first target intersect;
upon determination that the traffic environment of the vehicle and the first target trajectory is non-prioritized at the location where the trajectory of the vehicle and the trajectory of the first target intersect, transmit display information comprising an overhead view of the vehicle and the first target to the remote server;
receiving the display information;
displaying the display information to the remote operator;
receiving a starting reference vehicle selected by the remote operator pressing a button corresponding to the starting reference vehicle to be selected;
transmitting the starting reference vehicle to the vehicle; and
determining whether the starting reference vehicle has passed through the predetermined area; and
causing the vehicle to pass through the predetermined area by autonomous driving in case where the system determines that the starting reference vehicle has passed through the predetermined area.

* * * * *